(12) United States Patent
Eiselt (10) Patent No.: US 8,253,606 B2
(45) Date of Patent: Aug. 28, 2012

(54) APPARATUS AND A METHOD FOR PERFORMING A FRACTIONAL BIT EN- AND DECODING

(75) Inventor: Michael Eiselt, Kirchhelm (DE)

(73) Assignee: ADVA AG Optical Networking, Martinsried (DE)

( * ) Notice: Subject to any disclaimer, the term of this patent is extended or adjusted under 35 U.S.C. 154(b) by 66 days.

(21) Appl. No.: 12/973,150

(22) Filed: Dec. 20, 2010

(65) Prior Publication Data

US 2012/0026021 A1  Feb. 2, 2012

(30) Foreign Application Priority Data

Jul. 27, 2010  (EP) .................................... 10170944

(51) Int. Cl.
*H03M 7/00* (2006.01)
(52) U.S. Cl. ........................................... 341/50; 341/51
(58) Field of Classification Search .................. 341/50, 341/51, 67, 65, 56; 375/240, 262, 295, 298; 704/500, 501, 230, 205
See application file for complete search history.

(56) References Cited

U.S. PATENT DOCUMENTS

2002/0114401 A1* 8/2002 Kim et al. ..................... 375/262
* cited by examiner

*Primary Examiner* — Joseph Lauture
(74) *Attorney, Agent, or Firm* — Jenkins, Wilson, Taylor & Hunt, P.A.

(57) ABSTRACT

The invention relates to a fractional bit encoder (1) and a method for encoding a data stream into code word identifiers for a physical line encoder (13), wherein said fractional bit encoder (1) comprises a (1:K) demultiplexer (3) for a demultiplexing a received data stream into a predetermined number (K) of bit streams, a first ($K_1$:n) multiplexer (4) for re-multiplexing a first number ($K_1$) of said K bit streams onto n parallel lines transporting n re-multiplexed bit streams and a second multiplexer (5) re-multiplexing a second number ($K_2$) of said K bit streams ($K_2$:1) onto a single line transporting one further re-multiplexed bit stream, wherein n=[ld(M)] and M being a configurable number of different code word identifiers, a class detector (7) which evaluates the first n re-multiplexed bit streams to determine a class of the respective bit combination and a word encoder (10) which encodes the respective bit combination depending on the determined class of the bit combination.

18 Claims, 5 Drawing Sheets

|  | Bit 1 | Bit 2 | Bit 3 | Bit 4 | code word |
|---|---|---|---|---|---|
| Class 1 | 0 | 0 | 0 | d | C01 |
| | 0 | 0 | 1 | d | C02 |
| | 0 | 1 | 0 | d | C03 |
| | 0 | 1 | 1 | d | C04 |
| | 1 | 0 | 0 | d | C05 |
| | 1 | 0 | 1 | d | C06 |
| Class 2 | 1 | 1 | 0 | 0 | C07 |
| | 1 | 1 | 0 | 1 | C08 |
| | 1 | 1 | 1 | 0 | C09 |
| | 1 | 1 | 1 | 1 | C10 |

FIG 4

| M | n | N | K1 | K2 |
|---|---|---|----|----|
| 3 | 1 | 2 | 2 | 1 |
| 4 | 2 | 4 | 1 | 0 |
| 5 | 2 | 4 | 8 | 1 |
| 6 | 2 | 4 | 4 | 1 |
| 7 | 2 | 4 | 8 | 3 |
| 8 | 3 | 8 | 1 | 0 |
| 9 | 3 | 8 | 24 | 1 |
| 10 | 3 | 8 | 12 | 1 |
| 11 | 3 | 8 | 8 | 1 |
| 12 | 3 | 8 | 6 | 1 |
| 13 | 3 | 8 | 24 | 5 |
| 14 | 3 | 8 | 4 | 1 |
| 15 | 3 | 8 | 24 | 7 |
| 16 | 4 | 16 | 1 | 0 |
| 17 | 4 | 16 | 64 | 1 |
| 18 | 4 | 16 | 32 | 1 |
| 19 | 4 | 16 | 64 | 3 |
| 20 | 4 | 16 | 16 | 1 |
| 21 | 4 | 16 | 64 | 5 |
| 22 | 4 | 16 | 32 | 3 |
| 23 | 4 | 16 | 64 | 7 |
| 24 | 4 | 16 | 8 | 1 |
| 25 | 4 | 16 | 64 | 9 |
| 26 | 4 | 16 | 32 | 5 |
| 27 | 4 | 16 | 64 | 11 |
| 28 | 4 | 16 | 16 | 3 |
| 29 | 4 | 16 | 128 | 26 |
| 30 | 4 | 16 | 32 | 7 |
| 31 | 4 | 16 | 64 | 15 |
| 32 | 5 | 32 | 1 | 0 |
| 33 | 5 | 32 | 160 | 1 |
| 34 | 5 | 32 | 80 | 1 |
| 35 | 5 | 32 | 160 | 3 |
| 36 | 5 | 32 | 40 | 1 |
| 37 | 5 | 32 | 32 | 1 |
| 38 | 5 | 32 | 80 | 3 |
| 39 | 5 | 32 | 160 | 7 |
| 40 | 5 | 32 | 20 | 1 |
| 41 | 5 | 32 | 160 | 9 |
| 42 | 5 | 32 | 16 | 1 |
| 43 | 5 | 32 | 160 | 11 |
| 44 | 5 | 32 | 40 | 3 |
| 45 | 5 | 32 | 160 | 13 |
| 46 | 5 | 32 | 80 | 7 |
| 47 | 5 | 32 | 32 | 3 |
| 48 | 5 | 32 | 10 | 1 |
| 49 | 5 | 32 | 160 | 17 |
| 50 | 5 | 32 | 80 | 9 |

APPARATUS AND A METHOD FOR PERFORMING A FRACTIONAL BIT EN- AND DECODING

PRIORITY CLAIM

This application claims the benefit of European Patent Application No. 10170944.2 filed Jul. 27, 2010, the disclosure of which is incorporated herein by reference.

TECHNICAL FIELD

The invention relates to a method and an apparatus for fractional bit encoding and for fractional bit decoding.

TECHNICAL BACKGROUND

Conventional encoding methods use normally modulation formats such that the number of available code words, i.e. the number of modulation constellation points, is a power of two. In this case an integer number of bits can be encoded per symbol. Recently, further modulation formats have been proposed where the number of available code words is not a power of two and the information content per symbol comprises a non-integer number of bits. Examples of these modulation formats are for instance DPSK-3ASK or M-QAM. wherein M is an any square number. These modulation formats with M available code words have an information capacity of ld(M) bits per symbol, wherein ld(X) is the base-2 logarithm of X. In case that the number M of available code words is not of a power of two using conventional encoding methods or encoders only n=[ld(M)]bits can be encoded in each symbol, wherein [X] is the largest integer number smaller than or equal to X. Accordingly with this conventional encoding methods out of the available M code words only $2^n$ code words are utilized and M−$2^n$ possible code words remain unused.

Accordingly, it is an object of the present invention to provide an apparatus and a method increasing the transmission capacity when using encoding methods with modulation formats where the number of available code words is not a power of two.

SUMMARY OF THE INVENTION

Accordingly, the invention provides a fractional bit encoder for encoding a data stream into code words identifiers for a physical line encoder,
said fraction bit encoder comprising:
a (1:K) demultiplexer for de-multiplexing a received data stream into a predetermined number (K) of bit streams;
a first ($K_1$:n) multiplexer for re-multiplexing a first number ($K_1$) of said K bit streams onto n parallel lines transporting n re-multiplexed bit streams and
a second multiplexer ($K_2$:1) re-multiplexing a second number ($K_2$) of said K bit streams onto a single line transporting one further re-multiplexed bit stream,
wherein n=[ld(M)] and M being a configurable number of different code word identifiers;
a class detector which evaluates the first n re-multiplexed bit streams to determine a class of the respective bit combination; and
a word encoder which encodes the respective bit combination depending on the determined class of the bit combination.

In a possible embodiment of the fractional bit encoder according to the present invention the word encoder encodes depending on the determined class of the bit combination either the first n bits of the n re-multiplexed bit streams in one of (2N−M) code word identifiers or all (n+1) bits of all (n+1) re-multiplexed bit streams in one of M−(2N−M) code word identifiers, wherein N=$2^n$.

In a possible embodiment of the fractional bit encoder according to the present invention each of the (n+1) re-multiplexed bit streams is fed into a corresponding FIFO memory.

In a still further embodiment of the fractional bit encoder the first n FIFO memories connected to the first multiplexer are read out by the said class detector with a transmit clock which is synchronized with a symbol rate.

In a further possible embodiment of the fractional bit encoder according to the present invention the class detector determines the class of the respective bit combination by comparing the bit combination against bit combinations stored in a coding look-up table stored in a local memory connected to said class detector.

In a further embodiment of the fractional bit encoder according to the present invention the class detector determines the class of the respective bit combination by performing a predetermined logical operation on the respective bit combination.

In a further possible embodiment of the fractional bit encoder according to the present invention the word encoder encodes the re-multiplexed bit streams into code word identifiers by performing logical operations or by means of a coding look-up table stored in a local memory connected to said word encoder.

In a possible embodiment of the fractional bit encoder according to the present invention a scrambler is connected to said (1:K) demultiplexer, wherein said scrambler is provided for scrambling a data stream being generated by a data source.

In a still further embodiment of the fractional bit encoder according to the present invention the word encoder is connected to a physical line encoder which converts the code word identifier provided by said word encoder into a corresponding constellation point of said physical line signal transported via an optical or an electrical transport medium to a remote transceiver or a remote transponder.

In a possible embodiment of the fractional bit encoder according to the present invention the number (M) of code word identifiers is adjustable depending on a feedback control signal FCS indicating a signal quality of the transported signal received by said remote receiver or by said remote transponder.

In a possible embodiment of the fractional bit encoder according to the present invention the fractional bit encoder is integrated in a transmitter or in a transceiver or in a transponder.

The invention further provides a fractional bit decoder for decoding code word identifiers supplied by a physical line decoder comprising the features of claim 12.

Accordingly the invention provides a fractional bit decoder for decoding code word identifiers supplied by a physical line decoder, said fractional bit decoder comprising:
a word decoder which decodes each code word identifier received from said physical line decoder to provide a bit combination having n or (n+1) bits,
wherein n=[ld(M)] and M being a configurable number of different code word identifiers;
a class detector which evaluates the decoded bit combination to determine a class of said bit combination;
a first (n:$K_1$) demultiplexer for de-multiplexing n bits of said bit combination onto a first number ($K_1$) of parallel lines and a second (1:K₂) demultiplexer for de-multiplexing a (n+1)th bit of said bit combination onto a second number (K₂) of parallel lines depending on the determined class of said bit combination; and a (K:1) multiplexer for multiplexing K de-multiplexed bit streams on said parallel lines onto a single line transporting a serialized data stream, wherein K=K1+K2.

In a possible embodiment of the fractional bit decoder according to the present invention a descrambler is connected to said (K:1) multiplexer, wherein said descrambler is provided for descrambling the serialized data stream being supplied to a data sink.

In a possible embodiment of the fractional bit decoder according to the present invention the fractional bit decoder is integrated in a receiver or a transceiver or a transponder.

In a possible embodiment of the fractional bit decoder according to the present invention a detector is provided which detects a signal quality of a received signal transported via an electrical or optical transport medium and decoded by said physical line decoder to generate a feedback control signal FCS for a fractional bit encoder integrated in a remote transmitter, a remote transceiver or a remote transponder.

The invention further provides a data transmission system, comprising at least one fractional bit encoder, said fractional bit encoder having:

a (1:K) demultiplexer for de-multiplexing a received data stream into a predetermined number (K) of bit streams;

a first (K₁:n) multiplexer for re-multiplexing a first number (K₁) of said K bit streams onto n parallel lines transporting n re-multiplexed bit streams and a second (K₂:1) multiplexer for re-multiplexing a second number (K₂) of said K bit streams onto a single line transporting one further re-multiplexed bit stream, wherein n=[ld(M)] and M being a configurable number of different code word identifiers;

a class detector which evaluates the first n re-multiplexed bit streams to determine a class of the respective bit combination; and a word encoder which encodes the respective bit combination depending on the determined class of the bit combination, said data transmission system further comprising:

at least one fractional bit decoder for decoding code word identifiers supplied by a physical line decoder, said fractional bit decoder having:

a word decoder which decodes each code word identifier received from said physical line decoder to provide a bit combination having n or (n+1) bits, wherein n=[ld(M)] and M being a configurable number of different code word identifiers;

a class detector which evaluates the decoded bit combination to determine a class of said bit combination;

a first (n:K₁) demultiplexer for de-multiplexing n bits of said bit combination onto a first number (K₁) of parallel lines and a second (1:K₂) demultiplexer for de-multiplexing a (n+1)th bit of said bit combination onto a second number (K₂) of parallel lines depending on the determined class of said bit combination; and a (K:1) multiplexer for multiplexing K de-multiplexed bit streams on said parallel lines onto a single line transporting a serialized data stream, wherein K=K1+K2.

The invention further provides a method for performing a fractional bit encoding of a data stream into code word identifiers supplied to an optical or electrical physical line encoder, comprising the steps of:

(a) de-multiplexing the received data stream into a predetermined number (K) of bit streams;

(b) multiplexing a first number (K₁) of said K de-multiplexed bit streams onto n parallel lines transporting n de-multiplexed bit streams and multiplexing a second number (K₂) of said K de-multiplexed bit streams onto a single line transporting a further re-multiplexed bit stream, wherein n=[ld(M)] and M being a configurable number of different code word identifiers;

(c) evaluating the first n re-multiplexed bit streams to determine a class of the respective bit combination and (d) performing a word encoding of the respective bit combination depending on the determined class of the bit combination.

The invention further provides a method for performing a fractional bit decoding of code word identifiers supplied by a physical line decoder, comprising the features of claim 18.

Accordingly, the invention provides a method for performing a fractional bit decoding of code word identifiers supplied by a physical line decoder, comprising the steps of:

(a) decoding each code word identifier received from said physical line decoder to provide a bit combination having n or (n+1) bits, wherein n=ld[(M)] and M being a configurable number of different code word identifiers;

(b) evaluating the decoded bit combination to determine a class of said bit combination;

(c) demultiplexing n bits of said bit combination into a first number (K1) bit streams and de-multiplexing a (n+1)th bit of said bit combination into a second number (K2) of bit streams depending on the determined class of said bit combination, wherein K=K1+K2; and (d) multiplexing the K de-multiplexed bit streams into a serialized data stream.

BRIEF DESCRIPTION OF THE FIGURES

In the following preferred embodiments of an apparatus and a method performing a fractional bit encoding of a data stream into code word identifiers as well as an apparatus and a method for performing a fractional bit decoding of code word identifiers according to the present invention are described with reference to the enclosed figures.

DETAILED DESCRIPTION OF EMBODIMENTS

Figure 1:
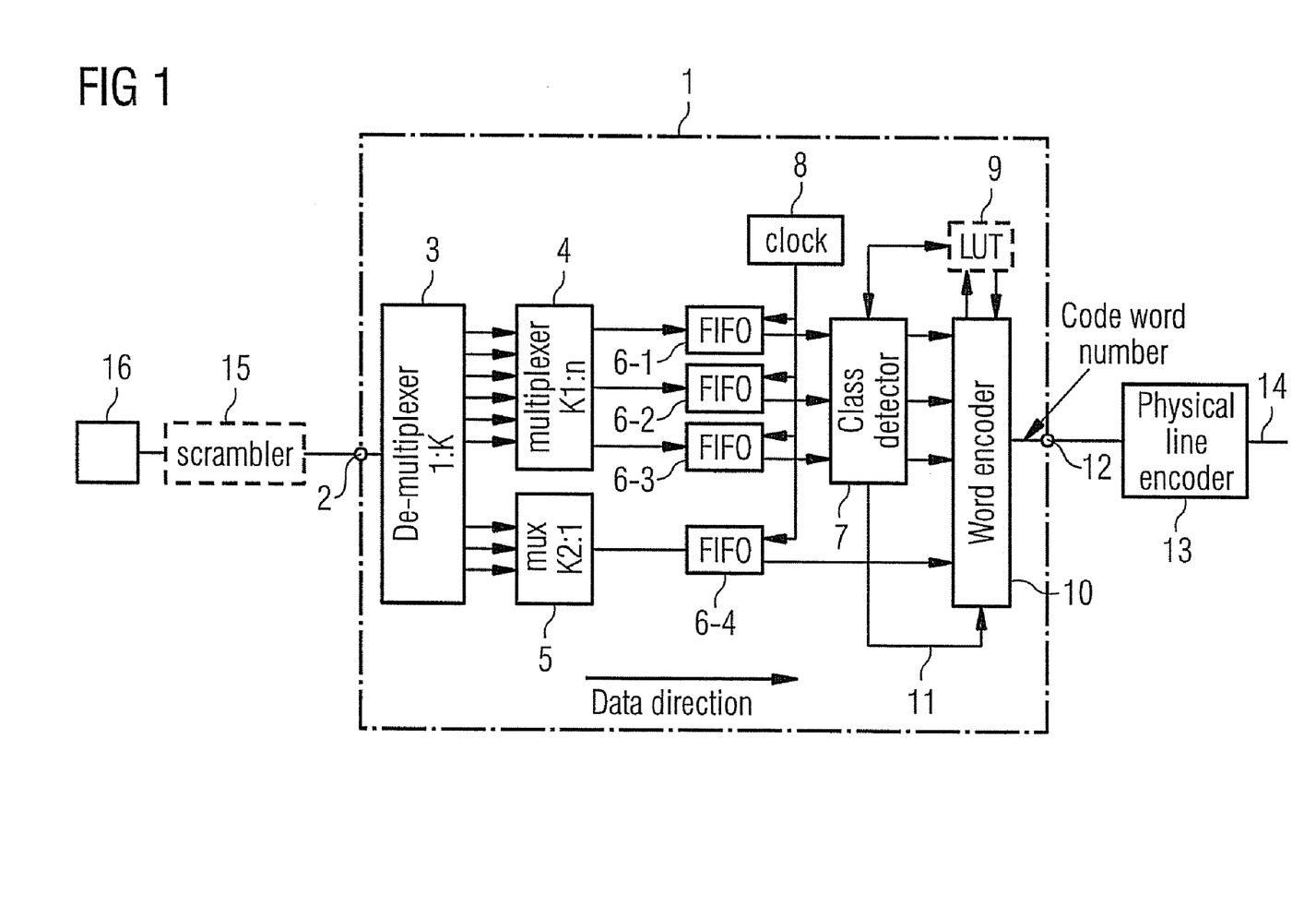
FIG. 1 shows a block diagram of a possible embodiment of a fractional bit encoder for encoding a data stream into code word identifiers according to the present invention.

FIG. 1 shows a possible embodiment of a fractional bit encoder 1 for encoding a data stream into code word identifiers for a physical line encoder wherein the fractional bit encoder 1 comprises a signal input 2 for receiving a data stream. The received data stream is de-multiplexed by a (1:K) multiplexer 3 to a predetermined number K of bit streams. The fractional bit encoder 1 further comprises a first (K1:n) multiplexer 4 for re-multiplexing a first number K1 of the K bit streams onto n parallel lines transporting n re-multiplexed bit streams. In the exemplary embodiment shown in FIG. 1 the number K1 of bit streams received by the first multiplexer 4 is K1=6 with the number n of re-multiplexed bit streams provided by said first multiplexer being n=3.

The fractional bit encoder 1 further comprises a second (K2:1) multiplexer 5 for re-multiplexing a second number K2 of the K bit streams provided by the demultiplexer 3 onto a single line transporting one further re-multiplexed bit stream. The number K of demultiplexed bit streams generated by the demultiplexer 3 is the sum of the first number K1 of bit streams supplied to the first multiplexer 4 and the number K2 of bit streams supplied to the second multiplexer 5 (K=K1+K2). The number n of re-multiplexed bit streams generated by the first multiplexer 4 is given by n=[ld(n)] wherein M is a configurable number of different code words identifiers. In the embodiment shown in FIG. 1 each of the (n+1) re-multiplexed bit streams generated by the first and second multiplexer 3, 4 is fed into a corresponding FIFO memory 6. In the shown embodiment the fractional bit encoder 1 comprises four FIFO memories 6-1, 6-2, 6-3, 6-4.

As can be seen in the shown embodiment the first n=3 FIFO memories 6-1, 6-2, 6-3 which are connected to the first multiplexer 4 are read out by a class detector 7 with a transmit clock being synchronized with a symbol rate. The class detector 7 evaluates the first n re-multiplexed bit streams to determine a class of the respective bit combination. The clock can be generated by a clock generator 8. In a possible embodiment the transmit clock is received by the fractional bit encoder 1 via a clock signal line. In an alternative embodiment the transmit clock is generated by an integrated clock generator 8 as shown in FIG. 1.

Figure 3:
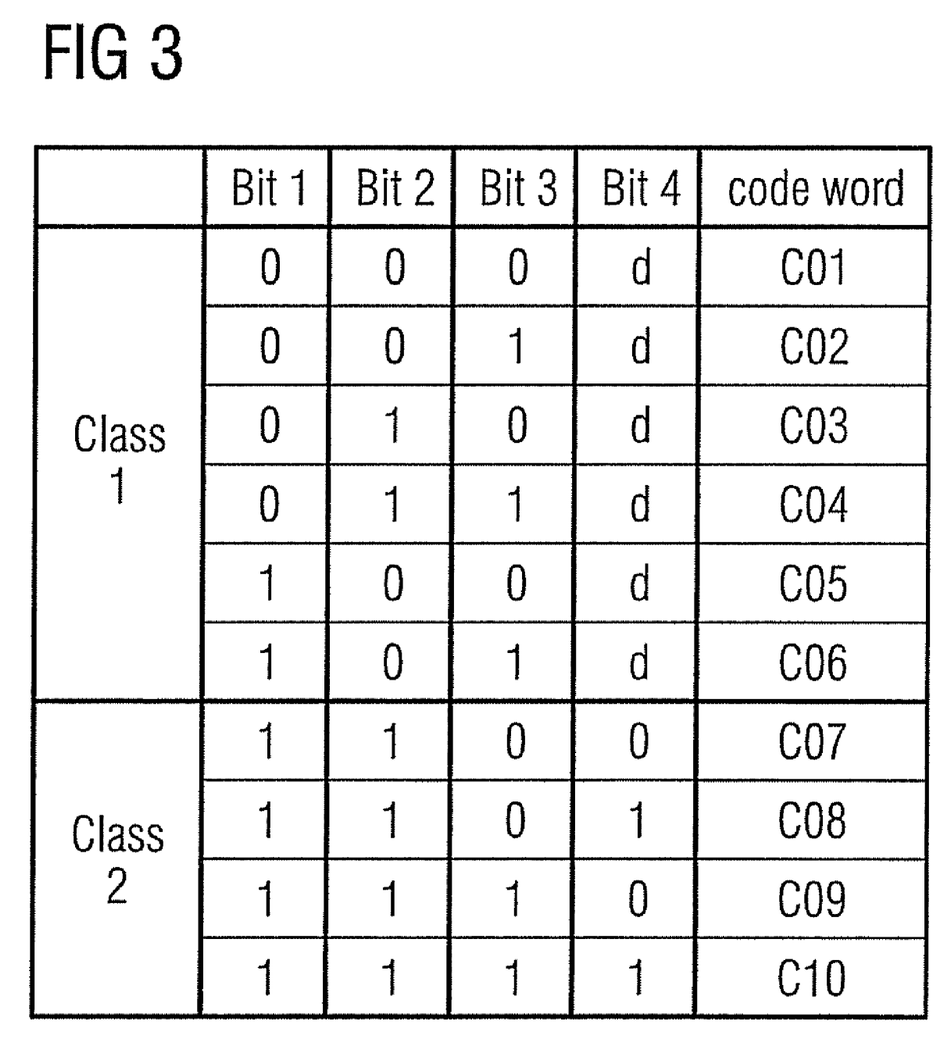
FIG. 3 an exemplary encoding table employed by a fractional bit encoder according to the present invention.

The class detector 7 determines a class of the respective bit combination in a possible embodiment by performing a predetermined logical operation on the respective bit combination. In an alternative embodiment the class detector 7 determines a class of the respective bit combination by comparing the bit combination against bit combinations stored in a coding look-up table stored in a local memory 9 connected to the class detector 7. The bit encoder 1 according to the present invention as shown in FIG. 1 further comprises a word encoder 10 which encodes a respective bit combination depending on the determined class of the bit combination. In a possible embodiment the class detector 7 can supply a class identification signal via a control line 11 to the word encoder 10. The word encoder 10 encodes depending on the determined class of the bit combination in a possible embodiment either the first n bits of the n re-multiplexed bit streams in one of (2N−M) co-word identifiers for all (n+1) bits or all (n+1) re-multiplexed bit streams in one of M−(2N−M) code word identifiers, wherein N=2'. In the exemplary embodiment of FIG. 1 the demultiplexer 3 de-multiplexes a received data stream into a predetermined number of K=9 bit streams wherein the first multiplexer 4 multiplexes K1=6 of the K=9 bit streams onto n=3 parallel lines transporting three re-multiplexed bit streams. The second multiplexer 5 re-multiplexes a second number K2=3 of the K=9 bit streams onto a single line transporting one further re-multiplexed bit stream. In the embodiment shown in FIG. 1 the word encoder can have access to a local memory 9 storing an encoding table. As can be seen in FIG. 3 the M=10 available code words are grouped into two classes. Using the abbreviation N=2', (2N−M) code words are contained in class 1, while class 2 comprises the remaining M−(2N−M)=2(M−N) code words. In the exemplary embodiment of FIG. 1 with n=3 and M=10 there are (2×8−10)=6 code words in the first class 1 and 10−(2×8−10)=2×(10−8)=4 code words in the second class 2. Each of the code words in class 1 is related to a specific n-bit combination of the word encoder input. In this way 1 for (2×N−M) n-bit combinations at the input, n-bits are encoded per symbol, while for the remaining M−N combinations, (n+1) bits are encoded by the word encoder 10 as shown in the exemplary encoding table of FIG. 3. Note that d in the table of FIG. 3 stands for "doesn't matter".

In the exemplary embodiment of FIG. 1 for six code words (of the first class) three information bits are encoded while in the remaining four code words (of the second class) four information bits are encoded. Accordingly with the fractional bit encoder 1 in the exemplary embodiment of FIG. 1 in average 3.25 bits are encoded per symbol.

In the embodiment shown in FIG. 1 the fractional bit encoder 1 comprises an output 12 which can be connected to a physical line encoder 13. The physical line encoder 13 converts the code word identifiers provided by the word encoder 10 into a corresponding constellation point of the physical line signal which is transported via a transport medium 14 to a remote transceiver or to a remote transponder. The transport medium 14 can be in a possible embodiment an optical transport medium. In an alternative embodiment the transport medium 14 can also be an electrical transport medium such as a wire. In a still further embodiment the transport medium 14 can be a wireless transport medium transporting a signal via wireless link.

In a possible embodiment the input 2 of the fractional bit encoder 1 can be connected to a scrambler 15 provided for scrambling a data stream generated by a data source before being applied to the input 2 of the fractional bit encoder 1. The scrambler 15 scrambles input data to achieve that all n-bit combinations have the same probability. When all n-bit combinations have the same probability an average of n×(2×N−M):N+(n+1)×(M−N):N=n+(M−N):N bits is encoded per symbol by the fractional bit encoder 1 according to the present invention. In the exemplary embodiment of FIG. 1 for six code words of class 1 three information bits are encoded while in the remaining four code words of class 2 four information bits are encoded. In average the fractional bit encoder 1 of this embodiment encodes 3.25 bits per symbol.

The maximum theoretical information content per symbol is ld(M), i.e. for M=10 ld(10)=3.322 per symbol. Accordingly, the fractional bit encoder 1 according to the present invention yields 97.8% of the theoretical limit for M=10. The effective information content I of the encoding technique as employed by the fractional bit encoder 1 according to the present invention can consider the probability of each symbol so that the standard formula can be applied:

$$I = -\Sigma P(C_i) \times ld(p(C_i))$$

where $P(C_i)$ with the probability of the occurrence of a symbol $C_i$.

With fractional bit encoder 1 according to the present invention $P(C_i)=1:N$ for all (2N−M) symbols in class 1 and $P(C_i)=1:(2×N)=$for all (2M−N) symbols in class 2. The summation yields is the same value for the information content as calculated above for the average number of bits per symbol: I=n+(M−N):N.

In the embodiment shown in FIG. 1 the class detector 7 determines the class of the respective bit combination by comparing the bit combination against bit combinations stored in a coding look-up table stored in the local memory 9. In an alternative embodiment the class detector 7 determines the class of the respective bit combination by performing a predetermined logical operation on the respective bit combinations. This logical operation can be performed by one or several hardwired logic wire gates performing logical operations. In a possible embodiment performing the logical operation is done by a logical operation unit which can be programmable. The physical line encoder 13 can perform an optical or electrical modulation converting the code word identifiers provided by the word encoder 10 into a corresponding modulation constellation point of a physical line signal transported via the optical or electrical transport medium 14 to a remote transceiver or a remote transponder. Different modulation schemes are possible such as phase-, amplitude-, frequency or polarization modulation or a combination of the above-mentioned modulation schemes.

In a possible embodiment of the fractional bit encoder 1 the scrambler 15 and the physical line encoder 13 can form different entities.

In an alternative embodiment the scrambler 15 as well as the physical line encoder 13 can be integrated in the fractional bit encoder 1 according to the present invention.

In a possible embodiment the fractional bit encoder 1 comprise a configuration interface for a configuration of the encoding look-up table stored in the local memory 9 or for programming a logic unit performing the logic operations on the respective bit combinations.

Figure 4:
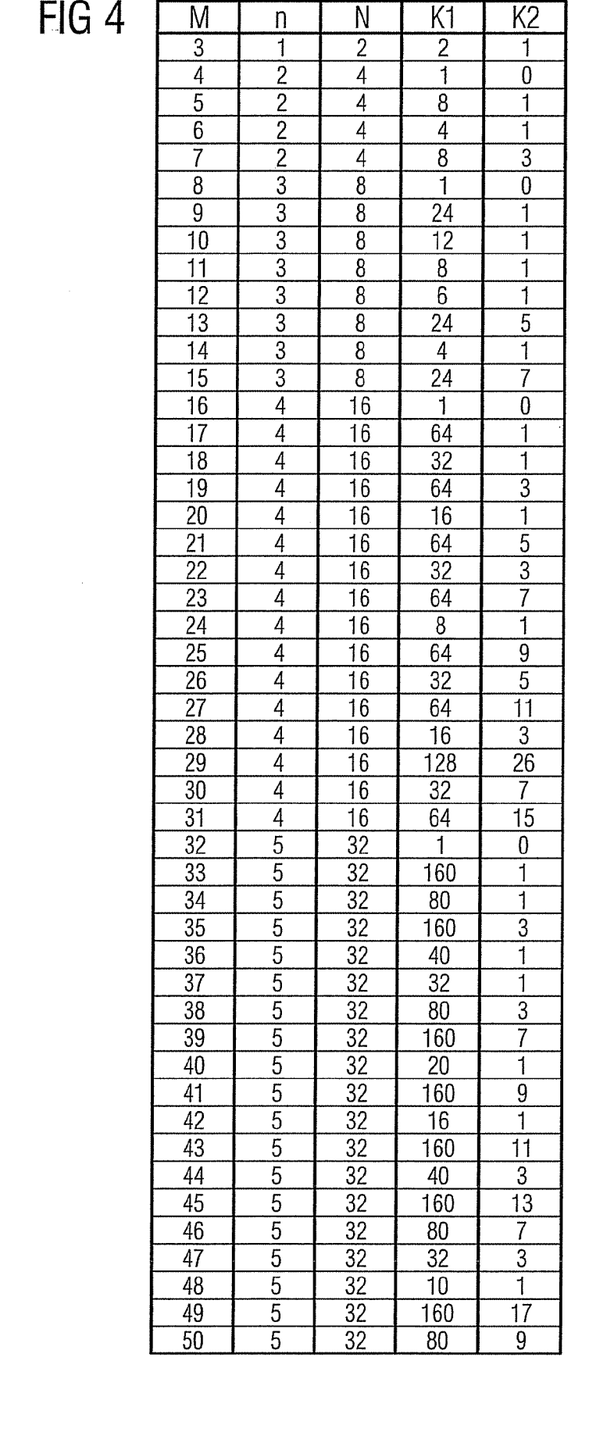
FIG. 4 a table for illustrating possible embodiments of fractional bit encoders for encoding a data stream into code word identifiers according to the present invention.

In a possible embodiment of the fractional bit encoder 1 according to the present invention the number M of code word identifiers is adjustable depending on a feedback control signal FCS indicating a signal quality of the transported signal received by the remote receiver or by the remote transponder. FIG. 4 shows a table showing possible values of K1, K2 for a different number of code words M. The number K can be chosen in a way that it can be split two ways into K1 and K2 with K=K1+K2 and K2:K1=(M−N):(N×n). The table shown in FIG. 4 shows corresponding values for n, N, K1, K2 and for a range of values of the number of code words M. In a possible embodiment the number M of code word identifiers is adjustable based on a measured bit error rate BER detected by a detection unit of the remote receiver or remote transponder. The feedback control signal FCS can be fed back to the fractional bit encoder 1 via a separate data transport channel or by means of an embedded communication channel ECC. In a possible embodiment the fractional bit encoder 1 as shown in FIG. 1 is integrated in a transmitter. In an alternative embodiment the fractional bit encoder 1 is integrated in a transceiver or in a transponder. In a possible embodiment the transponder is a pluggable device and can be plugged into a host device.

Figure 2:
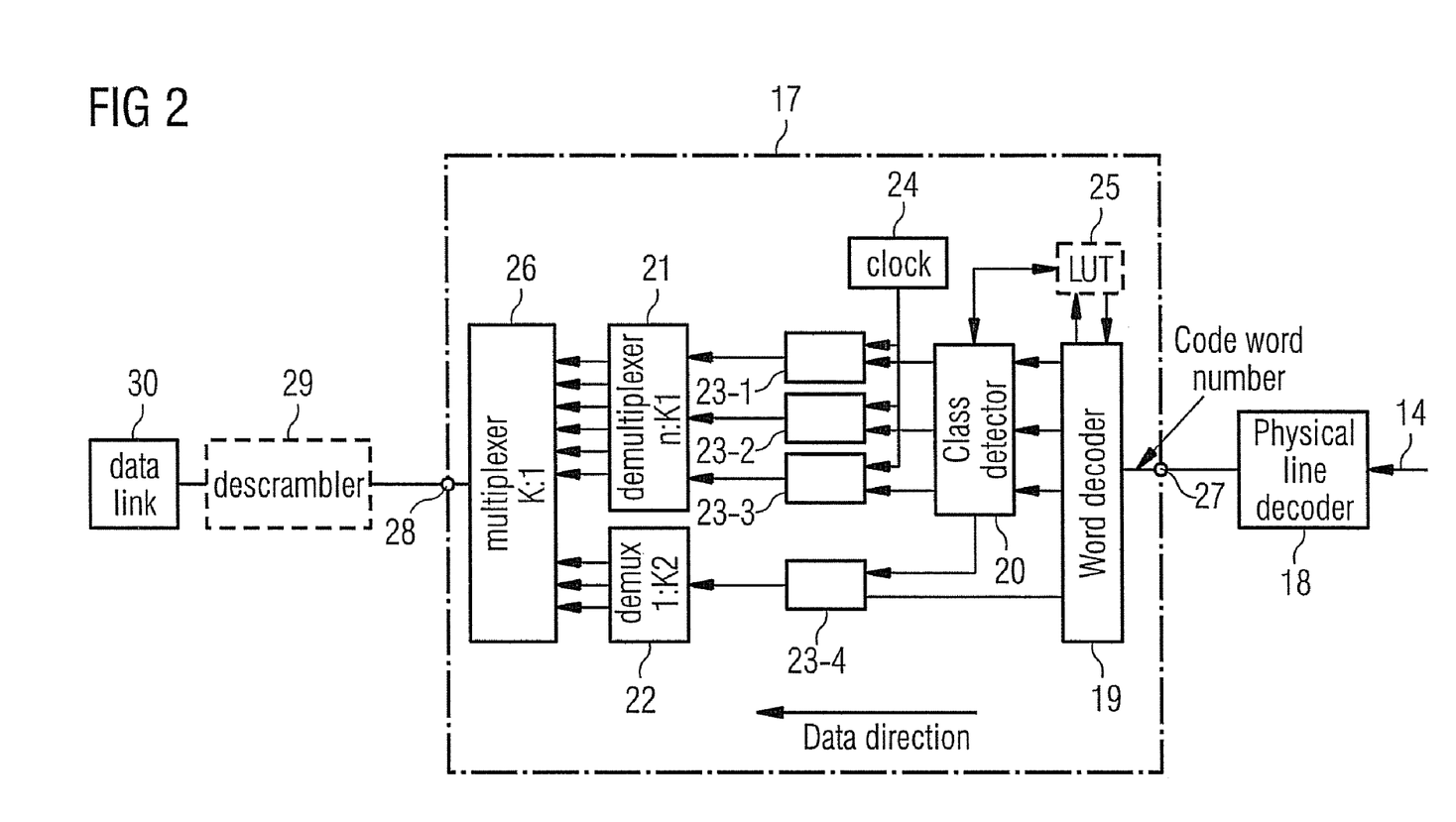
FIG. 2 shows a block diagram of a possible embodiment of a fractional bit decoder for decoding of code word identifiers according to the present invention.

FIG. 2 shows a block diagram of a possible embodiment of a fractional bit decoder 17 according to a possible embodiment of the present invention. The fraction bit decoder 17 is provided for decoding code word identifiers supplied by a physical line decoder 18 receiving data via an optical or electrical transport medium 14 from a fractional bit encoder 1 as shown in FIG. 1. As can be seen from FIG. 2 a fractional bit decoder 17 comprises a similar structure as the fractional bit encoder 1 shown in FIG. 1. The fractional bit decoder 17 comprises a word decoder 19 which decodes each code word identifier received from the physical line decoder 18 provided a bit combination having n or (n+1) bits, wherein n=[ld(M)] and M being a configurable number of different code word identifiers. The class detector 20 evaluates the decoded bit combination to determine the class of the bit combination. The fractional bit decoder 17 further comprises a first (n:K1) demultiplexer 20 for demultiplexing n bits of the bit combination to a first number K1 of parallel lines. Furthermore, the fractional bit decoder 17 comprises a second (1:K2) demultiplexer for de-multiplexing a (n+1) th bit of a bit combination onto a second number K2 of parallel lines depending on the determined class of the bit combination. As can be seen in FIG. 2 the fractional bit decoder 17 comprises in a possible embodiment FIFO memories 23-$i$ for storing temporarily n+1 bits. The FIFO memories 23-$i$ can receive a clock signal from a clock generator 24 integrated in the fractional bit decoder 17 or by a separate clock line. As can be seen in FIG. 2 the class detector 20 can have access to a local storage 25 storing a decoding look-up table similar to the encoding table shown in FIG. 3. The fractional bit decoder 17 as shown in FIG. 2 further comprises a (K:1) multiplexer 26 for multiplexing K demultiplexed bit streams received from the first demultiplexer 21 and the second demultiplexer 22 via parallel lines onto a single line transporting a serialized data stream, wherein K=K1+K2.

In the embodiment shown in FIG. 2 the fractional bit decoder 17 comprises a signal input 27 for connecting the fractional bit decoder 17 to the physical line decoder 18. The fractional bit decoder 17 further comprises an output 28 for outputting the multiplexed bit stream generated by the multiplexer 26. In a possible embodiment the fractional bit decoder 17 is connected on its output side to a descrambler 29 for descrambling the serialized data stream and supplying the descrambled data stream to a data sink 30. In a further embodiment the fractional bit decoder 17 can be integrated in a receiver or a transceiver or a transponder. In a possible embodiment of the fractional bit decoder 17 according to the present invention the fractional bit decoder 17 comprises a detector which detects a signal quality of a received signal transported via the electrical or optical transport medium 14 and decoded by the physical line decoder 18 to generate a feedback control signal FCS for a fractional bit encoder 1 integrated in a remote transmitter, in a remote transceiver or a remote transponder.

The invention further provides a data transmission system comprising at least one fractional bit encoder 1 as shown in FIG. 1 connected to a transport medium 14 and fractional bit decoder 17 as shown in FIG. 2. In a possible embodiment both the fractional bit encoder 1 and the fractional bit decoder 17 can be integrated in pluggable transponders. The pluggable transponders 1, 17 can also comprise the physical line encoder 13 and the physical line decoder 18. The transponders can be attached in an integrated manner to a physical transport medium 14 such as an optical fiber. Both transponders comprising the fractional bit encoder 1 and the fractional bit decoder 17 can be plugged into a host device. In a possible embodiment to ensure a synchronized output of all parallel lines and to avoid an under-run of the FIFO an initialization phase can be established during which only predefined symbols from class 2 are sent to initially fill all FIFO registers 23-$i$ evenly.

Figure 5:
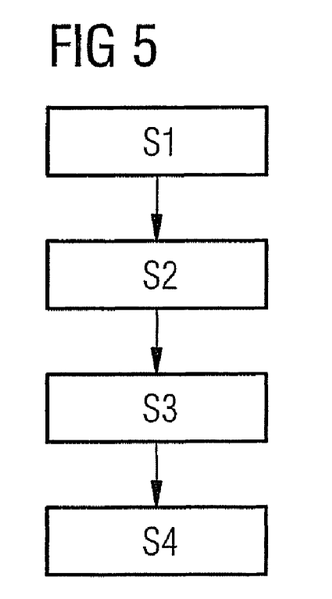
FIG. 5 a flowchart illustrating a possible embodiment of a method for performing a fractional bit encoding according to the present invention.

FIG. 5 shows a flowchart of a possible embodiment of a method for performing a fractional bit encoding of a data stream into code word identifiers supplied to an optical or electrical physical line encoder according to the present invention.

In a first step S1 a received data stream is demultiplexed into a predetermined number K of bit streams. This step can for example be performed by a demultiplexer 3 within the fractional bit encoder 1 as shown in FIG. 1.

In a further step S2 a first number K1 of the K dimultiplexed bit streams can be multiplexed onto n parallel lines transporting n demultiplexed bit streams. Furthermore, in step S2 a second number K2 of the K demultiplexed bit streams is multiplexed on a single line transporting a further re-multiplexed bit stream. In the shown embodiment n=[ld (M)] and M is the configurable number of different code word identifiers. Multiplexing in step S2 can be performed in a possible embodiment by the multiplexer 4 and the multiplexer 5 within a fractional bit encoder 1 as shown in FIG. 1.

In a further step S3 the first n re-multiplexed bit streams are evaluated to determine a class of the respective bit combination. The step S3 can be performed by the class detector 7 of the fractional bit encoder 1 as shown in FIG. 1.

In a further step S4 a word encoding of the respective bit combination is performed depending on the determined class of the bit combination. This can be performed in a possible embodiment by the word encoder 10 within a fractional bit encoder 1 as shown in FIG. 1.

Figure 6:
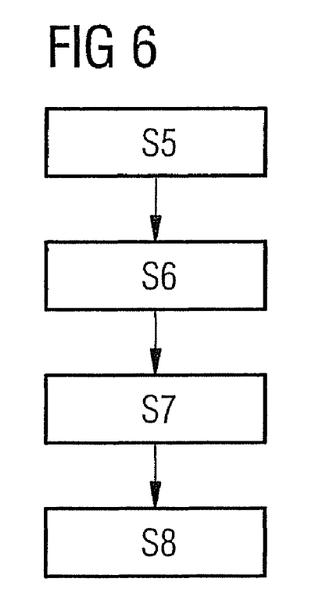
FIG. 6 a flowchart illustrating a possible embodiment of a method for performing a fractional bit decoding according to the present invention.

FIG. 6 shows a flowchart of a possible embodiment of a method for performing a fractional bit decoding of code word identifiers supplied by a physical line decoder according to the present invention.

In a step S5 each code word identifier received from the physical line decoder is decoded to provide a bit combination having n or (n+1) bits wherein n=ld[(M)] and M being a configurable number of different code word identifiers. Step S5 can for example be performed by the word decoder 19 within a fractional bit decoder 17 as shown in FIG. 2.

In a further step S6 the decoded bit combination is evaluated to determine a class of the bit combination. Step S6 can for example be performed by a class detector 20 within a fractional bit decoder 17 as shown in FIG. 2.

In a further step S7 n bits of the bit combination are de-multiplexed into a first number K1 of bit streams and a (n+1) th bit of the bit combination is de-multiplexed into a second number K2 of bit streams depending on the determined class of the bit combination, wherein K=K1+K2. Step S7 can be performed in a possible embodiment by demultiplexers 21, 22 within the fractional bit decoder 17 as shown in FIG. 2.

In a final step S8 K demultiplexer bit streams are multiplexed into a serialized data stream. Step S8 can be performed in a possible embodiment by the multiplexer 26 within the fractional bit decoder 17 as shown in FIG. 2.

In a further step (not shown) a descrambling can be performed for instance by a descrambler 29. In a possible embodiment the descrambler 29 is only activated when the scrambler 15 at the encoding side is also active. In a possible embodiment the fractional bit encoder 1 in FIG. 1 transmits an indication signal to the fractional bit decoder 17 as shown in FIG. 2 to indicate whether its scrambler 15 is activated or not. If the indication signal received by the fractional bit decoder 17 indicates that the scrambling unit 15 of the encoder 1 has been activated the descrambler 29 is automatically activated in a possible embodiment. The indication signal indicating the activation of the scrambler 15 on the transmit side can be transported via separate communication channel or by means of an embedded communication channel. In a further embodiment the scrambler 15 is activated in a first operation mode of the fractional bit encoder 1 and is deactivated in a second operation mode of the fractional bit encoder 1. The activation or deactivation of the scrambling unit 15 and the corresponding descrambler 2a can be performed in response to a control signal of a control unit.

According to the present invention it is possible to encode fractional bits per symbol using the fractional bit information content for modulation formats where the number of constellation points is not a power of two. In a possible embodiment the modulation format employed by the physical line encoder 13 can be changed between different kinds of modulation formats having a different number of modulation or constellation points according to a control signal. In this embodiment several different encoding tables can be stored in the local data storage 9 of the fractional bit encoder 1 for the different modulation formats. Alternatively, a logic unit for performing logic operations on the bits can be controlled in response to the selected modulation format.

The invention claimed is:

1. A fractional bit encoder for encoding a data stream into code word identifiers for a physical line encoder, said fractional bit encoder comprising:
    (a) a (1:K) demultiplexer for de-multiplexing a received data stream into a predetermined number (K) of bit streams;
    (b) a first ($K_1$:n) multiplexer for re-multiplexing a first number ($K_1$) of said K bit streams onto n parallel lines transporting n re-multiplexed bit streams and a second ($K_2$:1) multiplexer for re-multiplexing a second number ($K_2$) of said K bit streams onto a single line transporting one further re-multiplexed bit stream, wherein n=[ld (M)] and M being a configurable number of different code word identifiers wherein ld (M) is the base-2 logarithm of M;
    (c) a class detector which evaluates the first n re-multiplexed bit streams to determine a class of the respective bit combination; and
    (d) a word encoder which encodes the respective bit combination depending on the determined class of the bit combination.

2. The fractional encoder according to claim 1, wherein the word encoder encodes depending on the determined class of the bit combination either the first n bits of the n re-multiplexed bit streams in one of (2N−M) code word identifiers or all (n+1) bits of all (n+1) re-multiplexed bit streams in one of M−(2N−M) code word identifiers, wherein $N=2^n$.

3. The fractional bit encoder according to claim 2, wherein each of the (n+1) re-multiplexed bit streams is fed into a corresponding FIFO memory.

4. The fractional bit encoder according to claim 3, wherein the first n FIFO memories connected to the first multiplexer are read out by the said class detector with a transmit clock which is synchronized with a symbol rate.

5. The fractional bit encoder according to claim 1, wherein said class detector determines the class of the respective bit combination by comparing the bit combination against bit combinations stored in a coding look-up table stored in a local memory connected to said class detector.

6. The fractional bit encoder according to claim 1, wherein said class detector determines the class of the respective bit combination by performing a predetermined logical operation on the respective bit combination.

7. The fractional bit encoder according to claim 1, wherein said word encoder encodes the re-multiplexed bit streams into code word identifiers by performing logical operations or by means of a coding look-up table stored in a local memory connected to said word encoder.

8. The fractional bit encoder according to claim 1, wherein a scrambler connected to said (1:K) demultiplexer is provided for scrambling a data stream being generated by a data source.

9. The fractional bit encoder according to claim 1, wherein said word encoder is connected to a physical line encoder which converts the code word identifier provided by said word encoder into a corresponding constellation point of said physical line signal transported via an optical or an electrical transport medium to a remote transceiver or a remote transponder.

10. The fractional bit encoder according to claim 9, wherein the number (M) of code word identifiers is adjustable depending on a feedback control signal (FCS) indicating a signal quality of the transported signal received by said remote receiver or by said remote transponder.

11. The fractional bit encoder according to claim 1, wherein said fractional bit encoder is integrated in a transmitter or in transceiver or in transponder.

12. A data transmission system comprising at least one fractional bit encoder according to claim 1 and comprising at least one fractional bit decoder for decoding word identifiers supplied by a physical line decoder, said fractional bit decoder comprising: a word decoder which decodes each code word identifier received from said physical line decoder to provide a bit combination having n or (n+1) bits, wherein n=[ld(M)] and M being a configurable number of different code word identifiers; a class detector which evaluates the decoded bit combination to determine a class of said bit combination; a first (n:$K_1$) demultiplexer for de-multiplexing n bits of said bit combination onto a first number ($K_1$) of parallel lines and a second (1:$K_2$) demultiplexer for de-multiplexing a (n+1) th bit of said bit combination onto a second number of parallel lines depending on the determined class of said bit combination; and a (K:1) multiplexer for multiplexing K de-multiplexed bit streams on said parallel lines onto a single line transporting a serialized data stream, wherein K=$K_1$+$K_2$.

13. A fractional bit decoder for decoding code word identifiers supplied by a physical line decoder, said fractional bit decoder comprising:
(a) a word decoder which decodes each code word identifier received from said physical line decoder to provide a bit combination having n or (n+1) bits, wherein n=[ld(M)] and M being a configurable number of different code word identifiers wherein ld (M) is the base-2 logarithm of M;
(b) a class detector which evaluates the decoded bit combination to determine a class of said bit combination;
(c) a first (n:$K_1$) demultiplexer for de-multiplexing n bits of said bit combination onto a first number ($K_1$) of parallel lines and a second (1:$K_2$) demultiplexer for de-multiplexing a (n+1) th bit of said bit combination onto a second number of parallel lines depending on the determined class of said bit combination; and
(d) a (K:1) multiplexer for multiplexing K de-multiplexed bit streams on said parallel lines onto a single line transporting a serialized data stream, wherein K=$K_1$+$K_2$.

14. The fractional bit decoder according to claim 13, wherein a descrambler connected to said (K:1) multiplexer is provided for descrambling the serialized data stream being supplied to a data sink.

15. The fractional bit decoder according to claim 13, wherein said fractional bit decoder is integrated in a receiver or a transceiver or a transponder.

16. The fractional bit decoder according to claim 13, wherein a detector is provided which detects a signal quality of a received signal transported via an electrical or optical transport medium and decoded by said physical line decoder to generate a feedback control signal (FCS) for a fractional bit encoder integrated in a remote transmitter, a remote transceiver or a remote transponder.

17. A method for performing a fractional bit encoding of a data stream into code word identifiers supplied to an optical or electrical physical line encoder, comprising the steps of:
(a) de-multiplexing the received data stream into a predetermined number (K) of bit streams;
(b) multiplexing a first number ($K_1$) of said K de-multiplexed bit streams onto n parallel lines transporting n de-multiplexed bit streams and multiplexing a second number ($K_2$) of said K de-multiplexed bit streams onto a single line transporting a further re-multiplexed bit stream, wherein n=[ld(M)] and M being a configurable number of different code word identifiers;
(c) evaluating the first n re-multiplexed bit streams to determine a class of the respective bit combination and
(d) performing a word encoding of the respective bit combination depending on the determined class of the bit combination.

18. A method for performing a fractional bit decoding of code word identifiers supplied by a physical line decoder, comprising the steps of:
(a) decoding each code word identifier received from said physical line decoder to provide a bit combination having n or (n+1) bits, wherein n=ld[(M)] and M being a configurable number of different code word identifiers wherein ld (M) is the base-2 logarithm of M;
(b) evaluating the decoded bit combination to determine a class of said bit combination;
(c) demultiplexing n bits of said bit combination into a first number (K1) bit streams and de-multiplexing a (n+1)th bit of said bit combination into a second number (K2) of bit streams depending on the determined class of said bit combination, wherein K=K1+K2; and
(d) multiplexing the K de-multiplexed bit streams into a serialized data stream.

\* \* \* \* \*